US006266580B1

(12) United States Patent
Asahara et al.

(10) Patent No.: US 6,266,580 B1
(45) Date of Patent: Jul. 24, 2001

(54) CONTROL APPARATUS AND METHOD OF CONTROL SYSTEM HAVING DEAD TIME

(75) Inventors: Norimi Asahara, Aichi-ken; Masami Kondo, Toyota; Toshinari Suzuki, Aichi-ken; Katsumi Kono, Toyota; Ryoichi Hibino, Aichi-ken; Eiichi Ono, Aichi-ken; Masataka Osawa, Aichi-ken; Yuji Muragishi, Aichi-ken, all of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/577,160

(22) Filed: May 24, 2000

(30) Foreign Application Priority Data

May 24, 1999 (JP) .................................. 11-142921
May 26, 1999 (JP) .................................. 11-146772

(51) Int. Cl.$^7$ .............................. G05D 11/00; G05D 7/00
(52) U.S. Cl. ................................ 700/282; 700/4; 700/42; 700/44; 700/48; 700/245; 700/281; 318/610; 318/650; 701/70; 701/83; 701/84; 701/85; 701/86; 701/87; 422/82.13; 422/102
(58) Field of Search ..................................... 700/245, 284, 700/282, 281, 42, 45, 48, 78, 37, 41, 74, 30, 44, 72; 318/610, 650; 701/70, 83–87, 95, 54; 422/82.13, 102, 103; 74/469, 501.54; 172/810–812; 366/61; 249/1, 10; 298/17 R, 19 R, 22 R, 22 C

(56) References Cited

U.S. PATENT DOCUMENTS

| | | | |
|---|---|---|---|
| 4,054,780 | * 10/1977 | Bartley et al. | 700/30 |
| 5,268,625 | * 12/1993 | Plummer | 318/610 |
| 5,506,768 | * 4/1996 | Seem et al. | 700/41 |
| 5,568,377 | * 10/1996 | Seem et al. | 700/37 |
| 5,577,812 | * 11/1996 | Hirano et al. | 303/112 |
| 5,820,514 | * 10/1998 | Adachi | 477/46 |
| 6,036,923 | * 3/2000 | Laugharn, Jr. et al. | 422/82.13 |

FOREIGN PATENT DOCUMENTS

| | | |
|---|---|---|
| 3-180903 | 8/1991 | (JP) . |
| 10-301602A | 11/1998 | (JP) . |

OTHER PUBLICATIONS

Unbehauen et al., Application of a Digital Adaptive Controller to a Hydraulic System, 1993, IEEE., pp. 177–182.*
Recker et al., Indirect Adaptive Nonlinear Control of Discrete–Time Systems Containing a Deadzone, 1993, IEEE., pp. 2647–2853.*
Sei–Bum Choi and J.K. Hedrick, An Observer–Based Controller Design Method for Automotive Fuel–Injection Systems, Proceedings of the American Control Conference Jun. 1993, pp. 2567–2571.

* cited by examiner

Primary Examiner—William A. Cuchlinski, Jr.
Assistant Examiner—McDieunel Marc
(74) Attorney, Agent, or Firm—Oblon, Spivak, McClelland, Maier & Neustadt, P.C.

(57) ABSTRACT

A deviation between a target value of a quantity of state and an actual value of the quantity of state that is caused to follow the target value or a time-integral of the deviation is filtered. Based on the filtered value, a switching surface σ is calculated. Based on a value of the switching surface σ, a control input value u is outputted. The filter is set through comparison in Bode diagrams between a design model of a control system based on an ordinary sliding mode control method and a characteristic variation model of the control system, and by performing compensation in such a direction as to cancel out the variation. The filtering process makes it possible to properly control the control system having a dead time by the sliding mode control method.

21 Claims, 16 Drawing Sheets

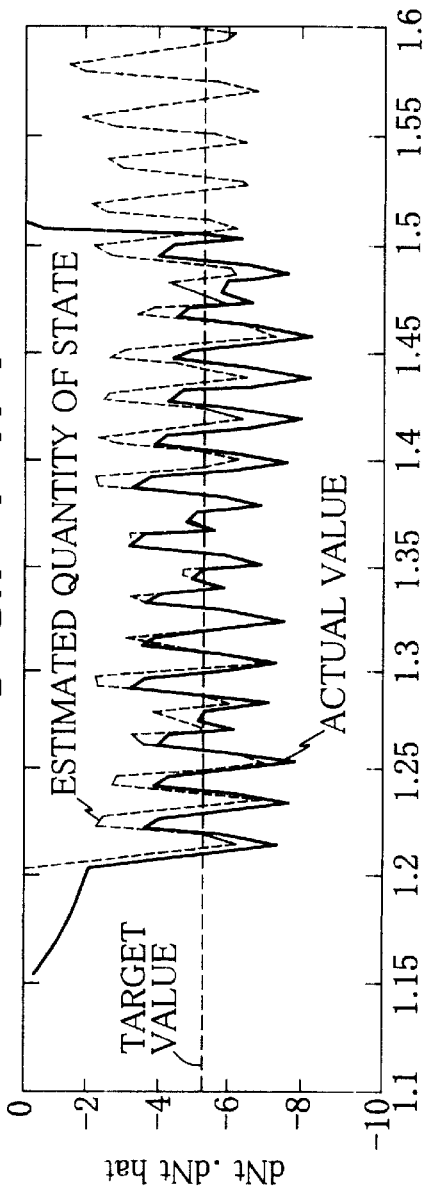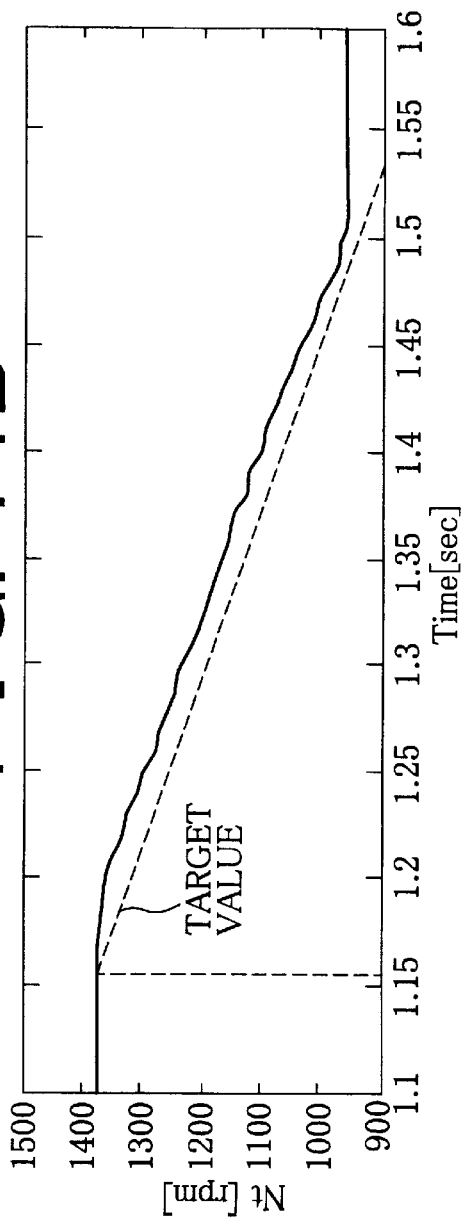

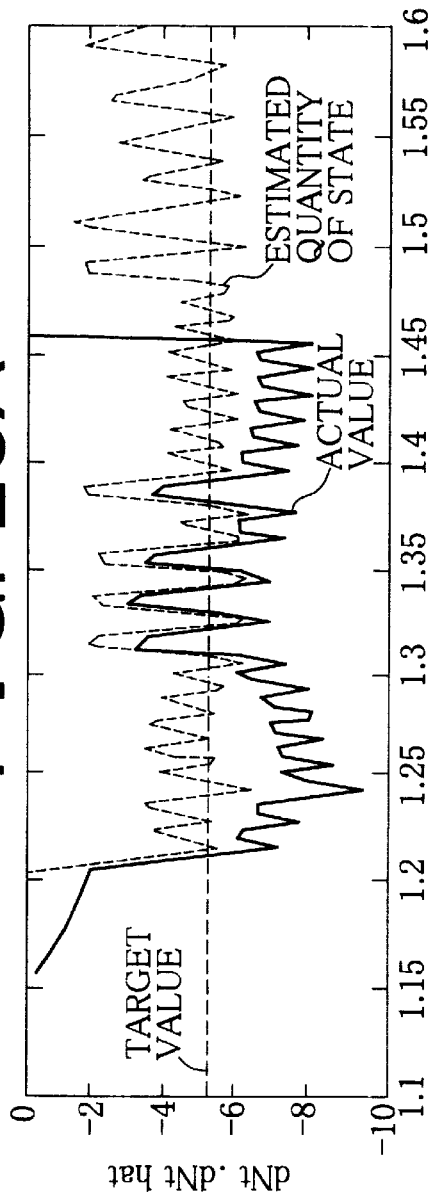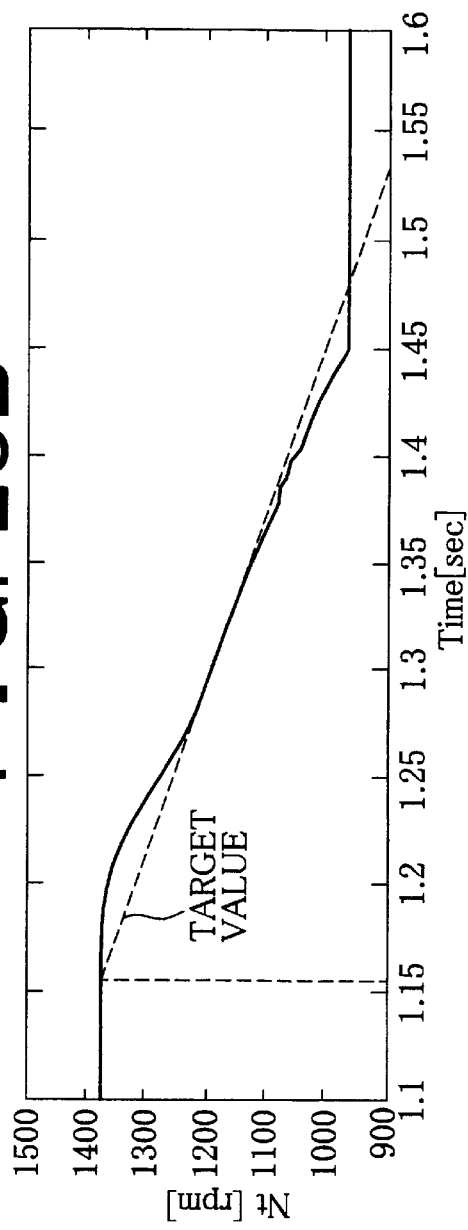

CONTROL APPARATUS AND METHOD OF CONTROL SYSTEM HAVING DEAD TIME

INCORPORATION BY REFERENCE

The disclosures of Japanese Patent Application Nos. HEI 11-142921 filed on May 24, 1999 and HEI 11-146772 filed on May 26, 1999 including the specification, drawings and abstract are incorporated herein by reference in their entirety.

BACKGROUND OF THE INVENTION

1. Field of the Invention

The present invention relates to a control apparatus and a control method of a control system having a dead time.

2. Description of the Related Art

A control method that performs feedback control of the amount of twist of an arm of a robot by using a sliding mode control method has been proposed (in, for example, Japanese Patent Application Laid-Open No. HEI 3-180903). In this control method, a switching surface is calculated by using a value obtained through filter processing, including integration, of the amount of twist as in equation (1). In accordance with the switching surface, the control input value is changed or switched. Using the switched control input value, the control is carried out. The control based on the above-described method is applicable to the sliding mode control of a control object having a resonance frequency, as in the control of a robot arm. But if dynamics are ignored, the loop gain must be set smaller than the resonance frequency, and therefore the responsiveness cannot be enhanced.

$$J \times d^2\theta/dt^2 = T \quad (1)$$

where J is the inertia of the robot, $\theta$ is the rotation angle, and T is the input torque.

A control apparatus in which the sliding mode control method is employed by modifying a non-linear term so as to stabilize the non-linear term, such as changes of a friction coefficient or the like is also known (in, for example, from Japanese Patent Application Laid-Open No. HEI 10-301602). In this control apparatus, when an uncertainty occurs in a C matrix that relates an output and the quantity of a state of a control object to each other, the non-linear input gain used in the control system is raised higherlarge than a predetermined value used when there is no uncertainty in the C matrix until the Lyapunov's stability condition is met.

In the application of the sliding mode control method to a control system such as a clutch hydraulic control system or the like, having a non-linearity due to different operation conditions, the presence of a large dead time, or the like, there is a problem of a considerable decrease in the robustness of the control system. FIGS. 17 to 20 indicate results of a simulation of a case where the sliding mode control method is applied to a clutch slip speed control system and the slip speed x1 is controlled to a target value of 20 rpm. FIG. 17 is a graph indicating changes of the slip speed x1 over time. FIG. 18 is a graph indicating time-dependent changes of the time differential x2 of the slip speed x1. FIG. 19 is a graph indicating time-dependent changes of the control input value u. FIG. 20 is a graph indicating time-dependent changes of the switching surface $\sigma$. As indicated in FIG. 17, the slip speed x1 does not immediately converge on the desired value, but converges only after repeated oscillations.

As a solution to this problem, it may be conceivable to apply the technique of the robot arm control model described above. However, this technique is intended for a linear control system having substantially no dead time. In this technique, therefore, there is no need to take into consideration changes of operation conditions (in a clutch hydraulic control system, for example, there are changes of the oil temperature, changes of the vehicle speed, changes of the slip speed range, changes of the engine load, changes due to aging, and the like), a large amount of dead time, and the like. Since the technique merely subjects observed values to an integrating processing, a similar theoretical development does not apply.

A control method designed so that the non-linear input becomes greater than a predetermined value used when there is no uncertainty in the C matrix, until the Lyapunov's stability condition is met, has a problem of requiring a complicated circuit.

As another related technology, a control apparatus that performs the sliding mode control of an air-fuel ratio control system of an internal combustion engine by using an estimated quantity of state supplied from an observer has been proposed (in, for example, "An Observer-Based Controller Design Method for Automotive Fuel-Injection System", Proceeding of the American Control Conference San Francisco, Calif., June 1993, which is hereby incorporated by reference) (the term "observer" as used hereafter refers to a device corresponding to that of this document). Since this control apparatus performs the sliding mode control by using an estimated quantity of state supplied from an observer, the control apparatus is able to solve a problem caused by performing the sliding mode control without using an observer, that is, prevent the chattering that occurs based on a fact that the amount of dead time is unignorably large relative to the responsiveness requirement of the engine air-fuel ratio control system. It is to be noted that the observer provides the estimated quantity of state by multiplying a value regarding the deviation between an estimated quantity of state and an actual quantity of state by a suitable gain, and feeding back the multiplication product.

If a sliding mode control method is applied to the presence of a large amount of dead time as in a shift control system of an automotive transmission or the like, there occurs a problem of a considerable decrease in the robustness of the system. FIGS. 21A and 21B indicate time-dependent changes of the rotation speed changing rate and time-dependent changes of the rotation speed, respectively, as results of a simulation where an ordinary sliding mode control method is applied. As can be seen from FIGS. 21A and 21B, mere application of an ordinary sliding mode control method does not achieve the proper following of the actual value of quantity of state with respect to the target value.

As a solution to this problem, it may be conceivable to use an observer as in the case of an engine air-fuel ratio control system described above. In this technique, however, the observer is constructed by simple addition of a linear term and a non-linear term. Therefore, the technique does not apply to a control object that is not compliant with a construction based on the addition. Furthermore, in this technique, only the dead time that is determined by a single factor, such as a dead time based on a time delay of an air-fuel ratio sensor, or the like, is taken into consideration, but the dead time determined in a complicated manner by a plurality of factors is not taken into consideration. Therefore, this technique is unable to estimate a precise quantity of state and, therefore, is unable to perform proper control.

FIGS. 22A and 22B indicate time-dependent changes of the rotation speed changing rate and time-dependent changes of the rotation speed as a result of a simulation where a sliding mode control method is applied, with a target value being used as an estimated quantity of state. FIGS. 23A and 23B indicate time-dependent changes of the rotation speed changing rate and time-dependent changes of the rotation speed as results of a simulation where a sliding mode control method is applied, with an actual value of quantity of state being used as an estimated quantity of state. As indicated in FIGS. 22A, 22B, 23A and 23B, even if a sliding mode control method is applied with a target value or an actual value of quantity of state being used as an estimated quantity of state, the actual value of the rotation speed changing rate drops considerably relative to the target value at around 1.25 seconds, causing a perceivable shock. Thus, proper control cannot be accomplished.

SUMMARY OF THE INVENTION

Accordingly, it is an object of the invention to provide an apparatus and a method for properly controlling a control system having a dead time.

In accordance with one aspect of the invention, a control apparatus for controlling a control system having a dead time by using a control input value, includes a computing unit that computes at least one of a deviation between a target value of a quantity of a state and an actual value of the quantity of the state that is caused to follow the target value and a time-integral of the deviation, a filter which is set based on a frequency characteristic of a gain of the control system and a frequency characteristic of a phase of the control system, and which filters at least one of the deviation and the time-integral computed by the computing unit, a switching surface calculator that calculates a switching surface based on the at least one of the deviation and the time-integral of the deviation filtered by the filter, and a switcher that switches the control input value based on a value of the switching surface.

The above-described control apparatus of the invention is able to control, with good reliability, the control system having a large amount of dead time by filtering at least one of the deviation between the target value and the actual value of the quantity of the state that is caused to follow the target value through the use of a filter set based on the frequency characteristics of the gain and phase of the control system, and calculating a switching surface based on the filtered value.

In the control apparatus, the control system having a dead time may be a clutch hydraulic control system installed in a vehicle. Normally, the clutch hydraulic control system is a control system that includes a non-linear term and a large amount of dead time.

In accordance with another aspect of the invention, a control apparatus includes an observer that estimates a present estimated quantity of a state of a control system based on an actual quantity of the state, a quantity of operation of the control system, and an estimated quantity of the state that is estimated at least a predetermined length of time before present estimation of the estimated quantity of the state.

This control apparatus is able to estimate an estimated quantity of the state with the dead time being taken into consideration, by estimating a present estimated quantity of the state based on the estimated quantity of the state that is estimated at least a predetermined length of time before present estimation. The "estimated quantity of the state that is estimated at least a predetermined length of time before present estimation" includes one or more of the estimated quantity of the state immediately preceding the present estimation, and the earlier estimated quantities of the state.

In the control apparatus of the invention, the observer may estimate the estimated quantity of the state while correcting a parameter of a model of the control system based on the dead time. This construction makes it possible to estimate a more proper estimated quantity of the state in accordance with the amount of the dead time. Therefore, the control object can be more properly controlled.

Furthermore, in the control apparatus of the invention, the aforementioned predetermined length of time may be set based on the dead time of the control system. By selecting a suitable predetermined length of time in accordance with the dead time, it becomes possible to provide a more accurate estimated quantity of the state. Therefore, the control system can be properly controlled.

BRIEF DESCRIPTION OF THE DRAWINGS

The foregoing and further objects, features and advantages of the present invention will become apparent from the following description of a preferred embodiments with reference to the accompanying drawings, wherein like numerals are used to represent like elements and wherein:

FIGS. 14A and 14B are graphs indicating results of a simulation of the specific example shown in FIG. 13, that is, time-dependent changes of the rotation speed changing rate and time-dependent changes of the rotation speed;

FIG. 23A is a graph indicating results of a simulation of control to which the sliding mode control method is applied with an actual value of quantity of state being used as an estimated quantity of state, that is, time-dependent changes of the rotation speed changing rate; and FIG. 23B is a graph indicating time-dependent changes of the rotation speed in the control indicated in FIG. 23A.

DETAILED DESCRIPTION OF PREFERRED EMBODIMENTS

Figure 1:
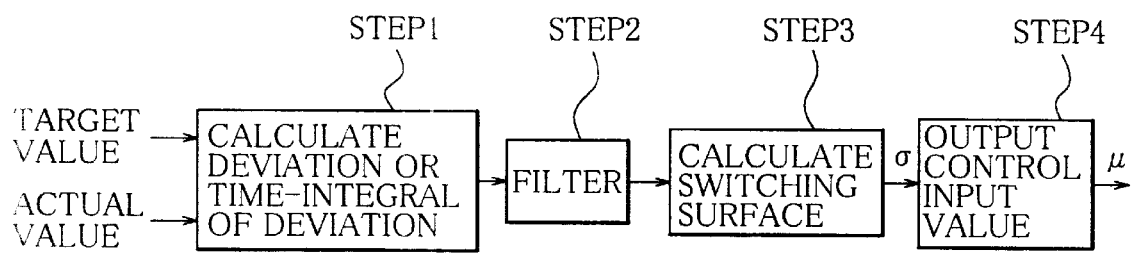
FIG. 1 is an illustration of an example of a control method according to an embodiment of the invention that controls a control system having a dead time by using a sliding mode control method.

Preferred embodiments of the invention will be described hereinafter with reference to the accompanying drawings. FIG. 1 illustrates a control method according to an embodiment of the invention that controls a control system having a dead time, by using a sliding mode control method. As shown in FIG. 1, a target value of a quantity of state and an actual value of the quantity of state that is intended to follow the target value are inputted to a processing unit, and a deviation between the values or a time-integrated value of the deviations is calculated (step 1). The calculated deviation or time-integral of the deviation value is subjected to a filter processing (step 2). Based on the filtered deviation or the filtered time-integral of the deviation value, a switching surface σ is calculated (step 3). Based on a value of the switching surface σ, a control input value u is outputted (step 4).

The control method and apparatus of this embodiment will be described in a case where a control method and a control apparatus of this embodiment are applied to a clutch control system having a large amount of dead time. The clutch control system is expressed by equation (1) as a linear quadratic system. In equation (1), x1 is the slip speed (rpm) of a clutch, x2 is a time differential of the slip x1 (rpm/s), u is a controller output (%), and a1, a2 are state variables.

$$\begin{bmatrix} \dot{x}1 \\ \dot{x}2 \end{bmatrix} = \begin{bmatrix} 0 & 1 \\ -a1 & -a2 \end{bmatrix} \begin{bmatrix} x1 \\ x2 \end{bmatrix} + \begin{bmatrix} 0 \\ b \end{bmatrix} u \quad (1)$$

Assuming an expanded system in which an actual value of the quantity of state is caused to follow a certain target value, equation (1) can be written into equation (2). In equation (2), r is a target value (rpm) of the slip speed x1, v is a time-integral of the deviation between the slip speed x1 and the target value r, and k is a constant of proportionality.

$$\begin{bmatrix} \dot{x}1 \\ \dot{x}2 \\ \dot{v} \end{bmatrix} = \begin{bmatrix} 0 & 1 & 0 \\ -a1 & -a2 & 0 \\ -1 & 0 & 0 \end{bmatrix} \begin{bmatrix} x1 \\ x2 \\ v \end{bmatrix} + \begin{bmatrix} 0 \\ b \\ 0 \end{bmatrix} u + \begin{bmatrix} 0 \\ 0 \\ 1 \end{bmatrix} r \quad (2)$$

With respect to the expanded system, a switching surface σ is calculated as in equation (5) based on the filter processing expressed by equations (3) and (4). In equations (3) and (4), z is a quantity of an internal state of the filter (vector value), and F, G, H, L are coefficients.

$$dz/dt = F \times z + G \times y \quad (3)$$

$$T(y) = H \times z + L \times y \quad (4)$$

$$\sigma = T(y) + x2 \quad (5)$$

Based on a value of the switching surface σ, a control input value u is calculated as in equation (6), and is outputted.

$$u = \varphi 1 + (x1 - k \times v) + \varphi 2 \times x2 + \varphi 3 \quad (6)$$

$$\varphi 1 = \begin{cases} -a1 & \text{when: } (x1 - k \times v)\sigma \geq 0 \\ +a2 & \text{when: } (x1 - k \times v)\sigma < 0 \end{cases}$$

$$\varphi 2 = \begin{cases} -a2 & \text{when: } x2 \times \sigma \geq 0 \\ +a2 & \text{when: } x2 \times \sigma < 0 \end{cases}$$

$$\varphi 3 = \begin{cases} -a3 & \text{when: } \sigma \geq 0 \\ +a3 & \text{when: } \sigma < 0 \end{cases}$$

(a1, a2, a3 are positive numbers)

Figure 2:
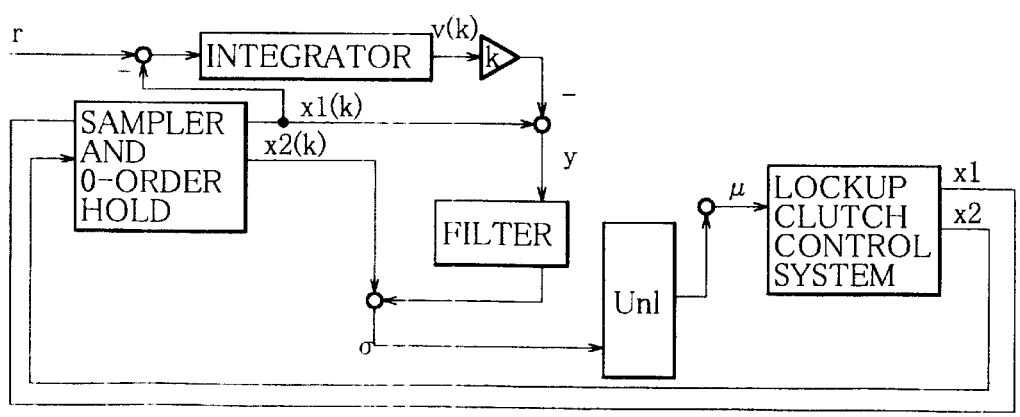
FIG. 2 is a block diagram of an example of a sliding mode controller in a clutch control system to which the control method of the embodiment is applied.

FIG. 2 is a block diagram illustrating an example of the construction of a sliding mode controller in a case where the control apparatus and method of this embodiment are applied to the clutch control system having a large dead time as described above. In the illustration of FIG. 2, a sampler and a zero-order holder are added in order to consider a discrete system.

Figure 3:
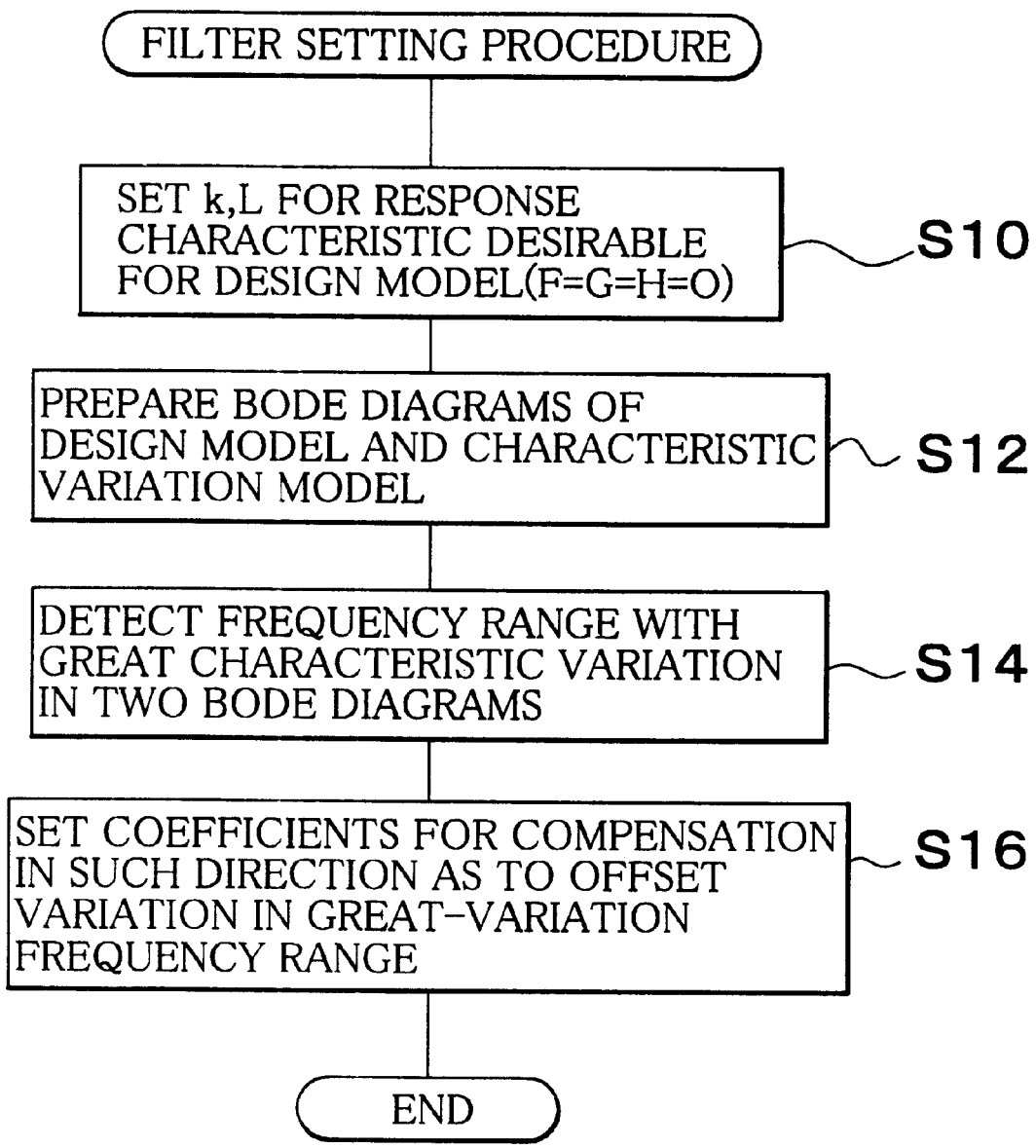
FIG. 3 illustrates a procedure of setting a filter.

The setting of a filter mentioned in step 1 in FIG. 1 and shown in FIG. 2 will be described. FIG. 3 illustrates a procedure of setting a filter. In step S10, the setting of a filter is started by setting a constant k and a coefficient L such that a desired response characteristic is exhibited in a design model in which no filter processing is performed. In the design model without the filter processing, a switching surface σ is expressed by equation (7). More specifically, the coefficients F, G, H are zero.

$$\sigma = L \times y + x2 \quad (7)$$

Figure 4:
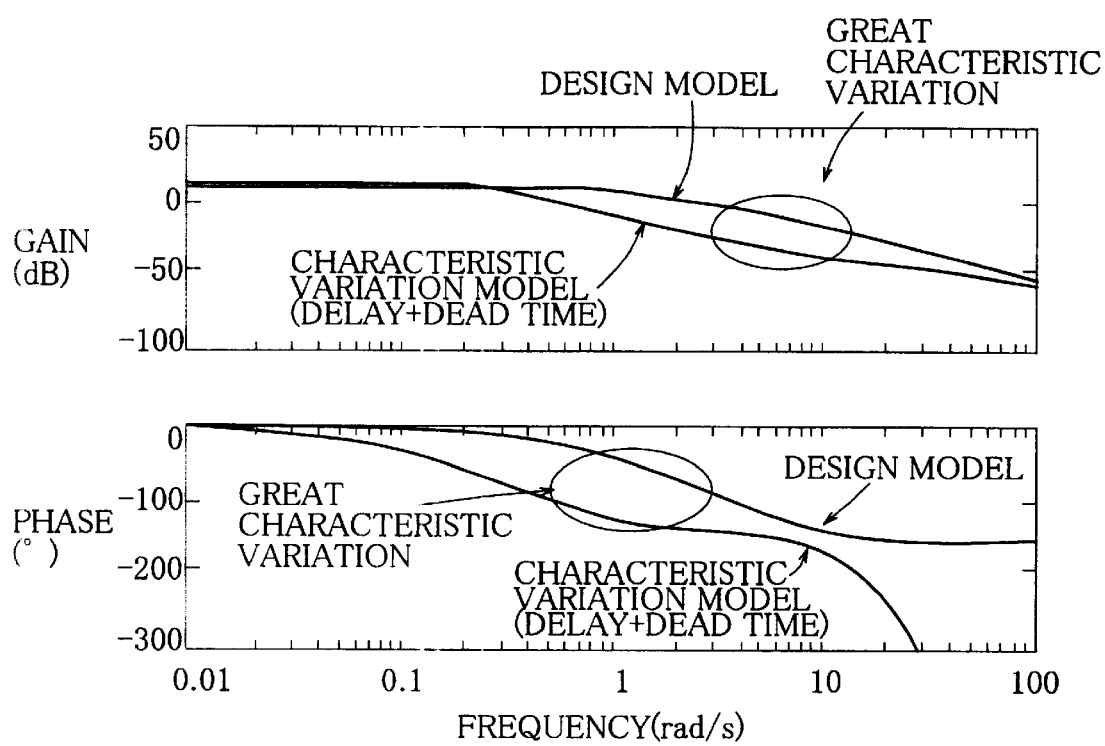
FIG. 4 shows Bode diagrams of a design model and a characteristic variation model.
Figure 5:
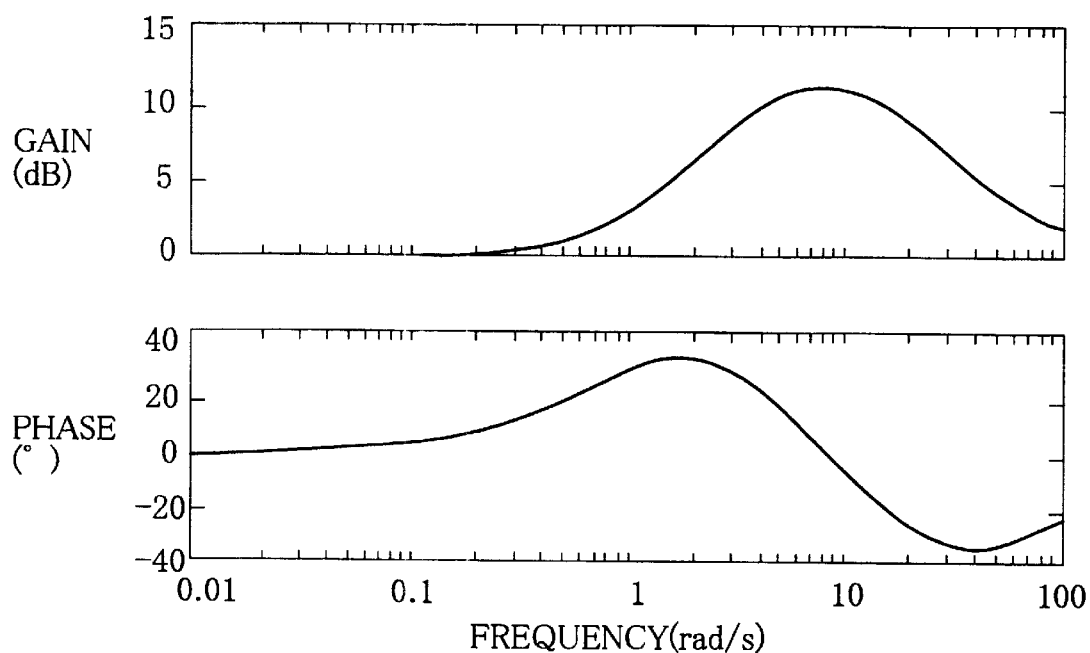
FIG. 5 shows Bode diagrams of a filter set based on the Bode diagrams shown in FIG. 4.

Subsequently in step S12, Bode diagrams with respect to the gain and phase of the design model and a characteristic variation model are prepared. In step S14, frequencies with large characteristic variations in the two Bode diagrams are detected. FIG. 4 shows examples of Bode diagrams of the design model and the characteristic variation model. In the Bode diagrams of gain and phase in FIG. 4, large variations occur in frequency ranges indicated by ellipses. In step S16, the coefficients F, G, H are set so that compensation is performed in such a direction as to cancel out the characteristic variations in the large-variation frequency ranges. The Bode diagrams of a filter that is set as described above are shown in FIG. 5. As indicated in FIG. 5, since the variation of characteristic (phase delay) in the frequency range indicated by the ellipses in FIG. 4 is largeer in the characteristic variation model than in the design model, a phase advancement filter is set such that the amount of correction becomes maximum in the large-variation frequency range. The amount of correction of the filter is conformed by the output waveform at the time of conformation of the filter. However, since the sliding mode control method itself has robustness, the compensation is performed by using a value that is less than an amount corresponding to the variation of characteristic. After the filter characteristic is determined, the filter coefficients F, G, H, L for expressing the state space are determined based on the filter characteristic (transfer function). The filter characteristic (transfer function) indicated in FIG. 5 is expressed by equation (8). The individual coefficients are calculated as in equations (9) to (12).

$$T = \frac{s^2 + 65.3728s + 62.2313}{s^2 + 18.2894s + 62.2343} y \tag{8}$$

$$F = \begin{vmatrix} -18.2894 & -62.2343 \\ 1.0000 & 0 \end{vmatrix} \tag{9}$$

$$G = \begin{vmatrix} 1 \\ 0 \end{vmatrix} \tag{10}$$

$$H = |47.0834 \quad -0.0030| \tag{11}$$

$$L = |1| \tag{12}$$

Figure 6:
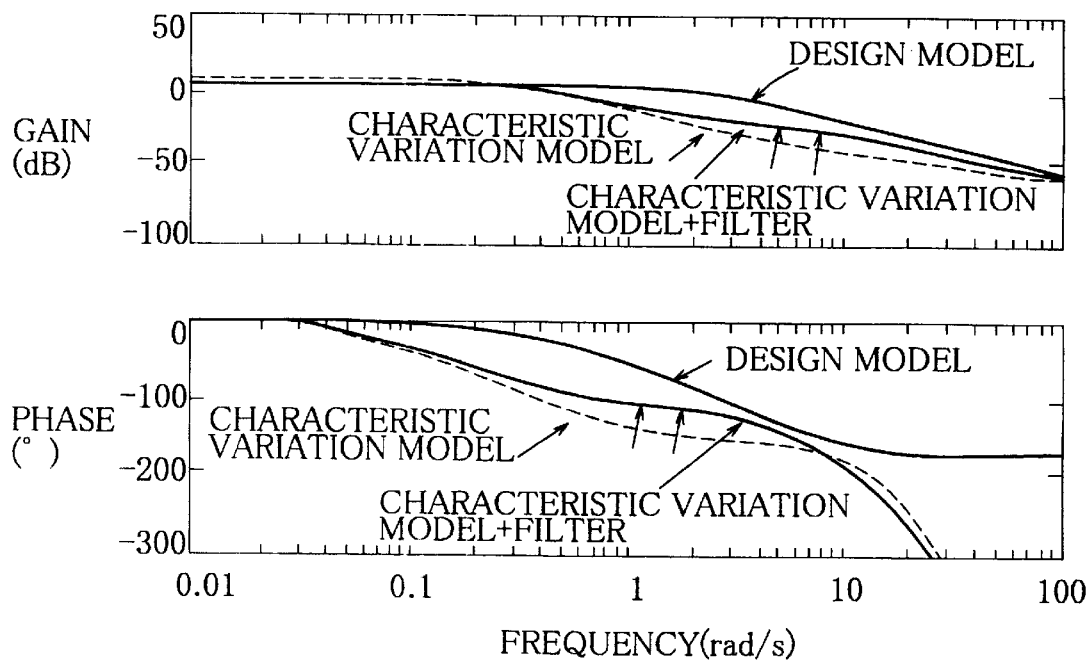
FIG. 6 shows Bode diagrams where the filter is used.
Figure 7:
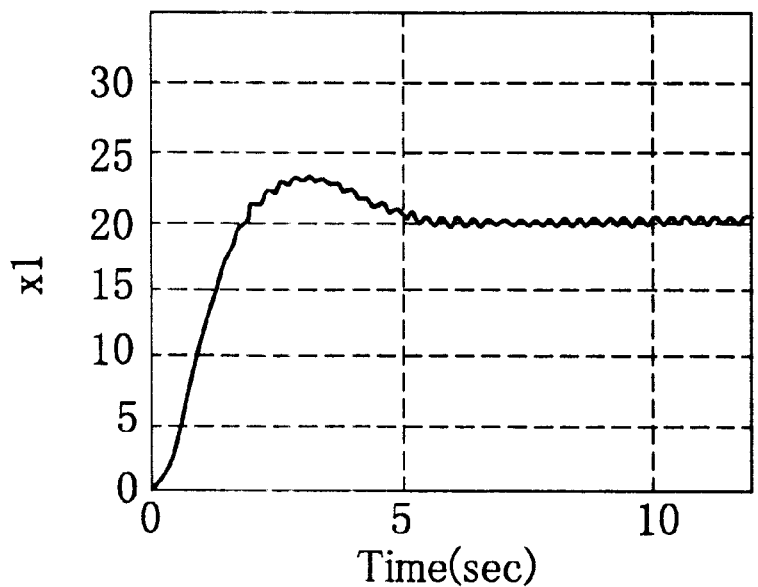
FIG. 7 is a graph indicating time-dependent changes of the slip speed x1 in a slip speed control system to which the control method of the embodiment is applied.
Figure 8:
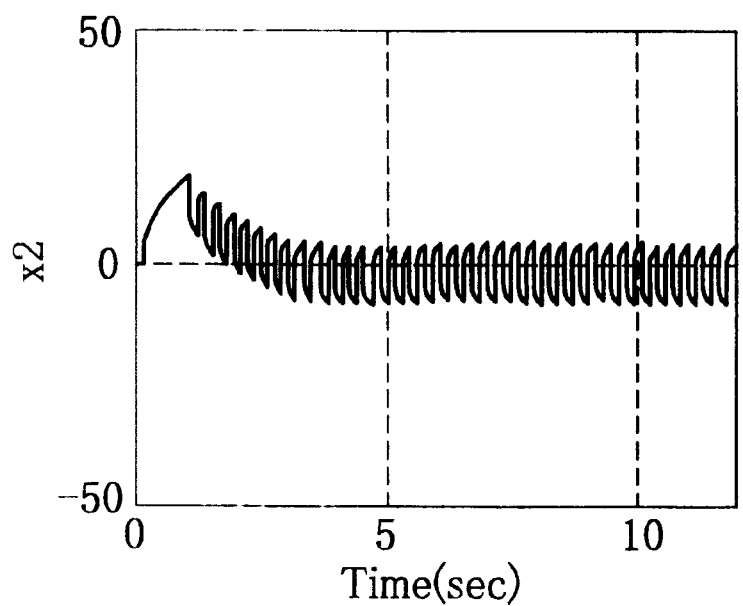
FIG. 8 is a graph indicating time-dependent changes of the time-differential x2 of the slip speed x1 in the slip speed control system to which the control method of the embodiment is applied.
Figure 9:
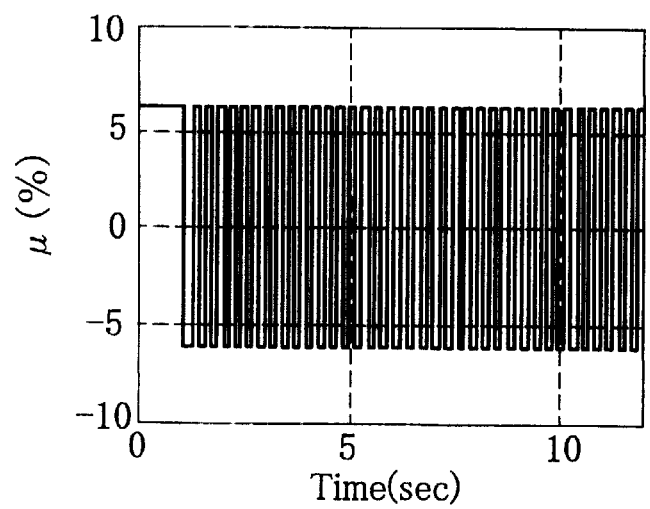
FIG. 9 is a graph indicating time-dependent changes of the control input value u in the slip speed control system to which the control method of the embodiment is applied.
Figure 10:
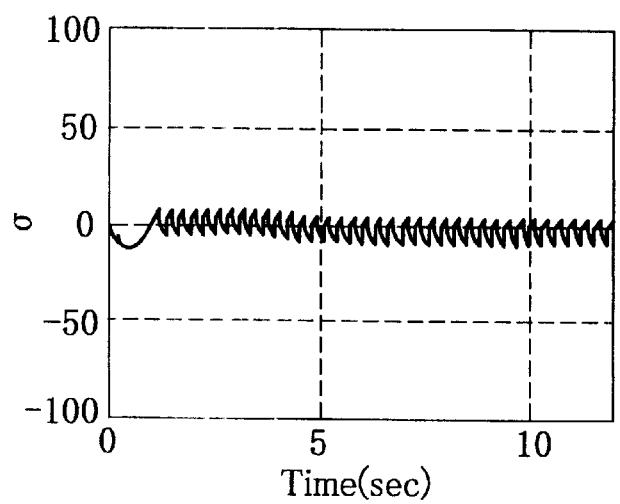
FIG. 10 is a graph indicating time-dependent changes of the switching surface σ in the slip speed control system to which the control method of the embodiment is applied.
Figure 12:
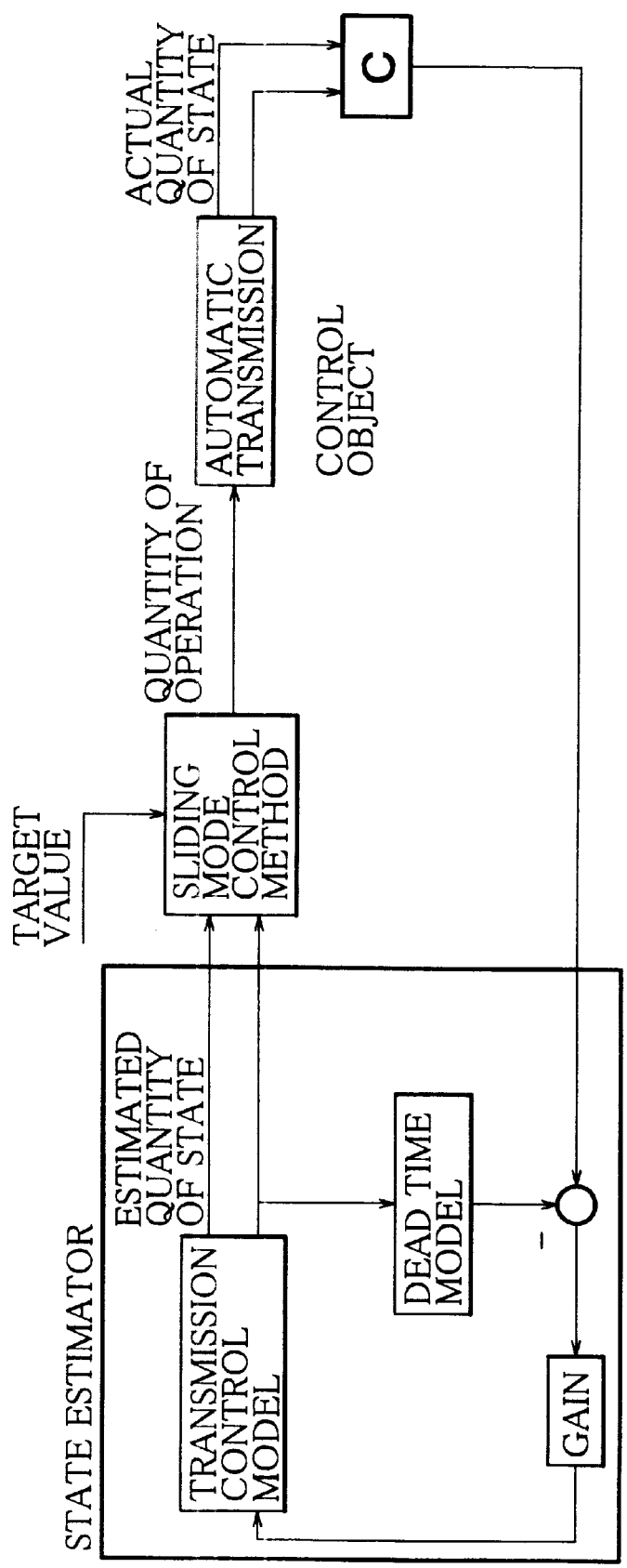
FIG. 12 is a block diagram of a construction for control where a control apparatus according to the invention controls an automotive automatic transmission by using the sliding mode control method.

FIG. 6 shows Bode diagrams of a control in which the filter determined as described above is used. As indicated in FIG. 6, the variation of characteristics of a system where the filter processing is performed is less in the characteristic variation model than in the design model. FIGS. 7 to 10 indicate results of a simulation of a case where the slip speed x1 is controlled with reference to a target value r of 20 rpm by using the filter in the clutch slip control system. FIG. 7 is a graph indicating time-dependent changes of the slip speed x1. FIG. 8 is a graph indicating time-dependent changes of the time differential x2 of the slip speed x1. FIG. 9 is a graph indicating time-dependent changes of the control input value u. FIG. 10 is a graph indicating time-dependent changes of the switching surface σ. As indicated in FIG. 7, the slip speed x1 immediately converges to the target value r (20 rpm), and exhibits high robustness, in comparison with a system that does not employ a filter as indicated in FIG. 12.

Thus, the control method of the first embodiment makes it possible to apply the sliding mode control method to a control system having a large amount of dead time, for example, a clutch slip control system and the like, by setting a filter as described above. Furthermore, the method allows a high robustness to be retained. The control method of the embodiment also makes it possible to set an appropriate filter.

Figure 11:
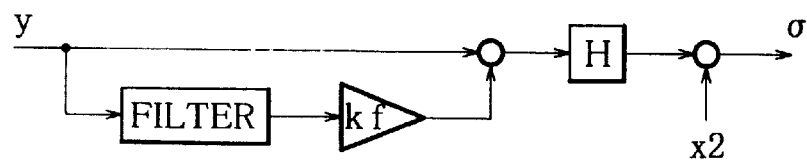
FIG. 11 is a block diagram of a filter according to a modification of the embodiment.

Although in the control method of the first embodiment, the filter and the switching surface σ are set as in equations (3) to (5), it is also possible to adopt a variable construction where the filter of the switching surface σ can be varied in accordance with the magnitude of the variation by introducing a scalar parameter. In that case, equations (4) and (5) may be replaced by equations (13) and (14). In equation (13), kf is a scalar parameter. A filter employed in that case is illustrated in the block diagram of FIG. 11.

$$T(y)=kf \times z+y \tag{13}$$

$$\sigma=H \times T(y)+x2 \tag{14}$$

Although in the control method of the first embodiment, the clutch slip control system is controlled as a servo system construction, it is also possible to adopt a construction in which the system is controlled without constructing a servo system. In that case, the control becomes feasible by, for example, replacing equation (2) for an expanded system with equation (15).

$$y=x1-r \tag{15}$$

Although the control method of the first embodiment is described in conjunction with a case in which the control is applied to a clutch slip speed control system as an example, the control method of the embodiment may also be applied to a different control system having a large amount of dead time.

A second embodiment of the invention will now be described. FIG. 12 is a block diagram illustrating a construction adopted for a case where a control apparatus according to the invention controls an automotive automatic transmission as a control target by employing a sliding mode control method. As indicated in FIG. 12, in the control apparatus of the embodiment, a state estimator device (observer) accepts input of a present quantity of operation and input of a feedback amount for correcting the deviation between an actual value of quantity of state and an estimated quantity of state. Based on the input values, the control apparatus calculates an estimated quantity of state, and then outputs the estimated quantity of state. The feedback amount is expressed as a product of multiplication of the deviation between the actual value of quantity of state and a value obtained by taking a dead time factor into consideration on the basis of the estimated quantity of state outputted from the state estimator, by a gain. By taking the dead time factor into consideration, a precise estimated quantity of state can be provided. In the sliding mode control, the switching surface σ is calculated based on the target value and the estimated quantity of state outputted from the state estimator. Based on a value of the switching surface σ, the value of a quantity of operation is switched. If the estimated quantity of state is a precise one, the switching of the quantity of operation by the sliding mode control method also becomes precise, so that proper control can be performed.

Figure 13:
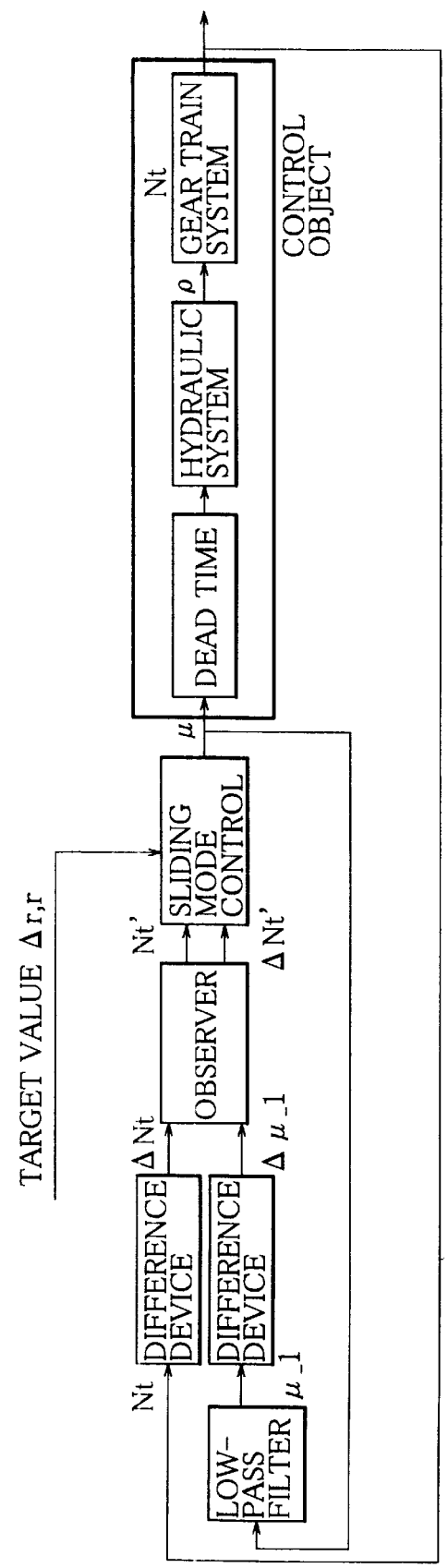
FIG. 13 is a block diagram of a specific example of a construction for control where an automatic transmission is controlled by the sliding mode control method.

A specific example of a control apparatus for controlling an automatic transmission by providing an estimated quantity of state with a dead time factor being taken into consideration will be described below. FIG. 13 is a block diagram of this specific example. As a control object model, a system is considered which is systematized by separating a gear train system and a hydraulic system incorporating a dead time, and in which a continuous time model is converted by a zero-order hold at a sampling period sample tt, as expressed by equations (16) and (17). In equations (16) and (17), Xnt and Xx2 are quantities of state, Nt is the rotation speed of the transmission, x2 is the hydraulic pressure, u is the quantity of operation, and nk is a value which is determined by taking a dead time into consideration, and which can be set to a product of multiplication of the sampling period by a constant value in a discrete system. In equation (16), Asysd, Bsysd, Csysd, Dsysd are coefficients of the gear train system model. In equation (17), Ahyd, Bhyd, Chyd, Dhyd are coefficients of the hydraulic system model.

Control Object Model (Discrete Time System)

Gear train system:

$$Xnt(k+1) = Asysd \times Xnt(k) + Bsysd \times x2(k)$$

$$Nt(k) = Csysd \times Xnt(k) + Dsysd \times x2(k) \tag{16}$$

Hydraulic system:

$$Xx2(k+1) = Ahyd \times Xx2(k) + Bhyd \times u(k-nk)$$

$$x2(k) = Chyd \times Xx2(k) + Dhyd \times u(k-nk) \tag{17}$$

A low-pass filter removes high-frequency noises and, in this example, is constructed as in equation (18). In equation (18), X_1 is a quantity of state, u_is the output of the low-pass filter (quantity of operation), A_1, B_1, C_1, D_1 are coefficients of the low-pass filter.

Low-Pass Filter $$X\_1(k+1) = A\_1 \times X\_1(k) + B\_1 \times u(k)$$

$$u\_1(k) = C\_1 \times X\_1(k) + D\_1 \times u(k) \tag{18}$$

A difference device determines a deviation $\Delta Nt$ between the present and previous values of the rotation speed Nt, and a deviation $\Delta u$ between the present and previous values of the quantity of operation u_1 passed through the low-pass filter, as in equations (19) and (20).

Difference Device $$\Delta Nt(k) = Nt(k) - Nt(k-1) \tag{19}$$

$$\Delta u(k) = u\_1(k) - u\_1(k-1) \tag{20}$$

An observer calculates a deviation $\Delta Nt'$ of the estimated rotation speed and an estimated rotation speed Nt' based on the deviation $\Delta Nt$ of the rotation speed and the deviation $\Delta u$ of the quantity of operation supplied from the difference device, as in equations (21) and (22). In equation (21), $\Delta Nt'(k-nk)$, that is, the first term between the parentheses in the last term on the right side, is a term provided by taking the dead time into consideration. More specifically, $\Delta Nt'(k-nk)$ is the deviation of the estimated rotation speed (deviation of estimated quantity of state) provided at a step that is nk number of steps before the present estimation. The value nk is set to a multiple of the sampling period by a predetermined number in the discrete system, as in the control object model. In equation (21), Aodb, Bobd, L are coefficients of the observer.

Observer $$\Delta Nt'(k+1) = Aobd \times \Delta Nt'(k) + Bobd \times \Delta u(k) - L \times (\Delta Nt'(k-nk) - \Delta Nt(k)) \tag{21}$$

$$\Delta Nt'(k+1) = Nt'(k) + \Delta Nt'(k) \tag{22}$$

In the sliding mode control, a switching surface $\sigma$ is calculated based on the target value r and the amount of decrease $\Delta r$ of the target value, and the estimated rotation speed Nt' and the deviation $\Delta Nt'$ of the estimated rotation speed supplied from the observer, as in equation (23). Based on a value of the switching surface $\sigma$ thus calculated, the quantity of operation is switched as in equation (25). The target value r and the decrease $\Delta r$ of the target value are expressed as in equations (25) and (26). In equation (23), S1 and S2 are gains in the sliding mode control. In equation (24), $\gamma$ and $\eta$ are also gains in the sliding mode control. In equations (25) and (26), Koubai is the amount of decrease of the target value per step of the sampling duration.

Sliding Mode Control

Switching surface $\sigma$:

$$\sigma = S1 \times (\Delta Nt'(k+1) - \Delta r(k)) + S2 \times (Nt'(k+1) - r(k)) \tag{23}$$

Feedback output u:

(i) if $\sigma \geq 0$, then $u = \gamma$ (ii) if $\sigma < 0$, then $u = \eta$ \tag{24}

Target Value $$\Delta r(k) = \text{Koubai} \tag{25}$$

$$r(k) = r(k-1) + \text{Koubai} \tag{26}$$

Figure 21A:
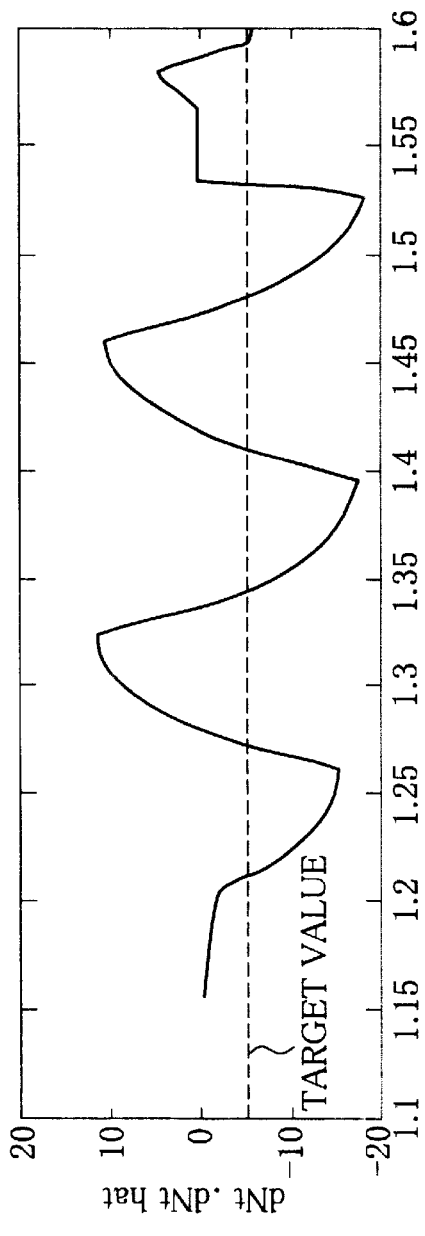
FIG. 21A is a graph indicating results of a simulation of control to which the ordinary sliding mode control method is applied, that is, time-dependent changes of the rotation speed changing rate.
Figure 21B:
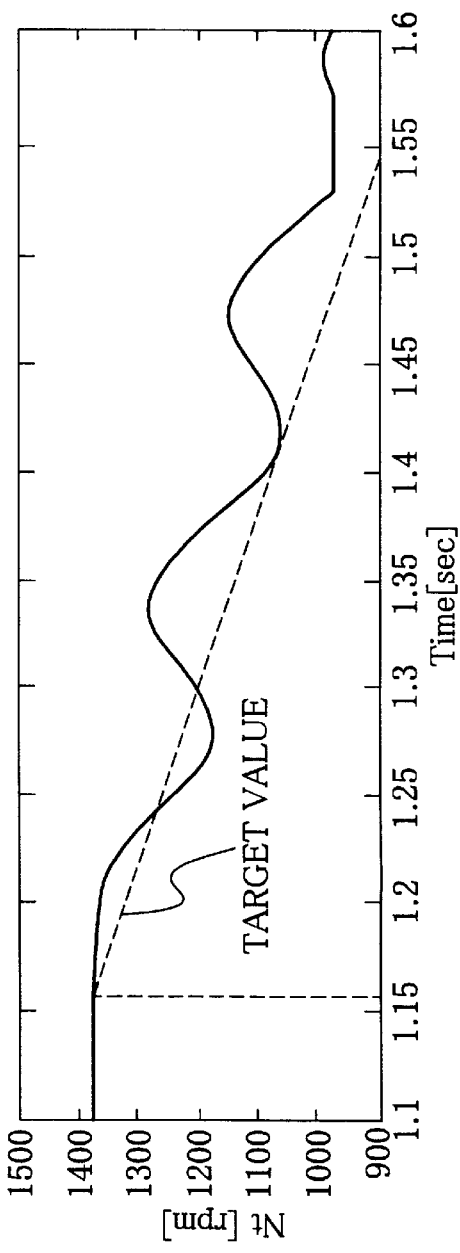
FIG. 21B is a graph indicating time-dependent changes of the rotation speed in the control indicated in FIG. 21A.
Figure 22A:
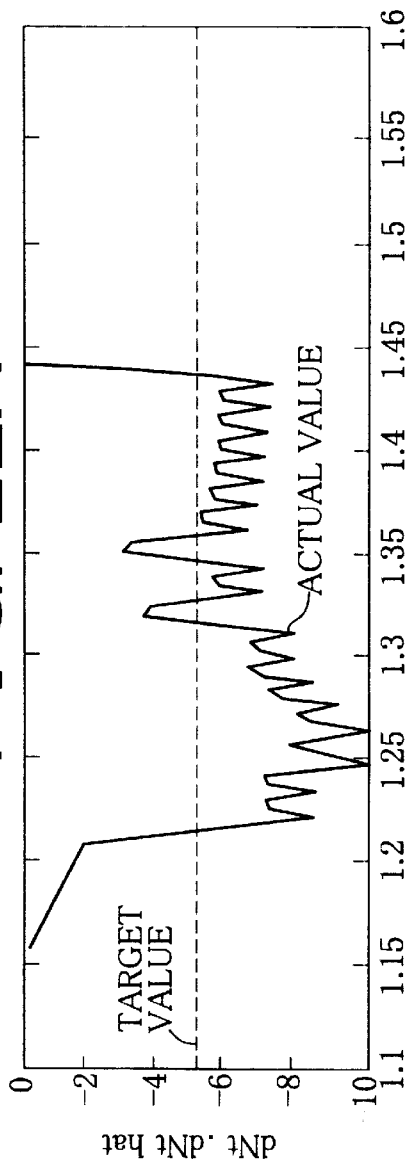
FIG. 22A is a graph indicating results of a simulation of control to which the sliding mode control method is applied with a target value being used as an estimated quantity of state, that is, time-dependent changes of the rotation speed changing rate.
Figure 22B:
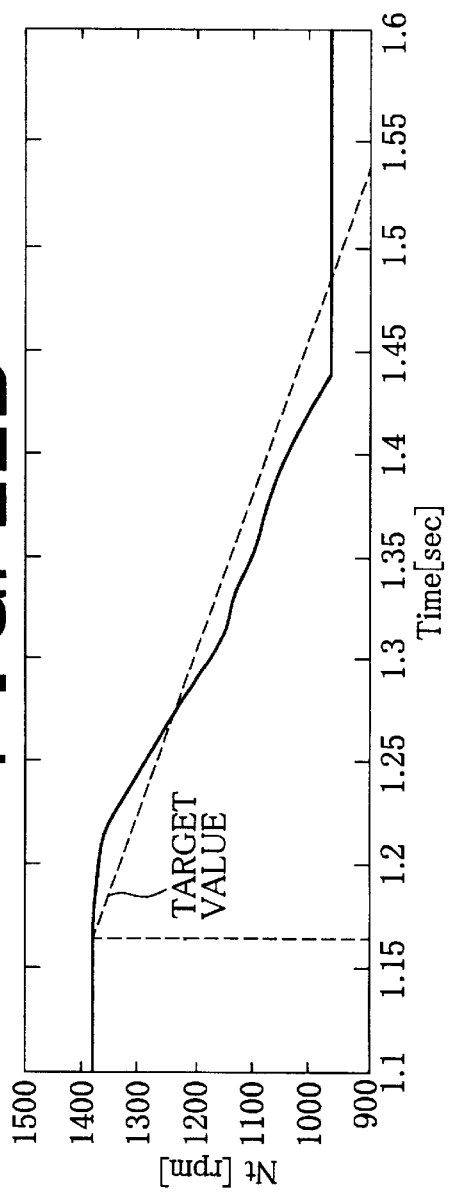
FIG. 22B is a graph indicating time-dependent changes of the rotation speed in the control indicated in FIG. 22A.

For the simulation of this specific example, the coefficients are set to values shown in Table 1, and the values shown in Table 2 are used as initial values. The simulation provides results as indicated in FIG. 14. As indicated in FIG. 14, although the rotation speed changing rate in both the estimated value and the actual value varies with respect to the target value, the rotation speed Nt decreases in a manner similar to the manner of decrease of the target value while remaining slightly higher than the target value. Thus, proper control is achieved in comparison with the related art indicated in FIGS. 21 to 23.

TABLE 1

| Coefficient | Content | Value (physical value) |
|---|---|---|
| sample | Sampling time | 4.000 msec |
| nk | Assumed dead time steps (dead time msec/sample tt) | 12 steps (48 msec/4.000 msec) |
| Asysd | Gear train system model coefficients | 9.801986733067554e-001 |
| Bsysd |  | 3.564238804784046e-001 |
| Csysd |  | 1.000000000000000e-000 |
| Dsysd |  | 0.000000000000000e-000 |
| Ahyd | Hydraulic system model coefficients | 9.231163463866358e-001 |
| Bhyd |  | 7.688365361336422e-002 |
| Chyd |  | 1.000000000000000e-000 |
| Dhyd |  | 0.000000000000000e-000 |
| A1 | Low-pass filter | 8.136322038466814e-001 |
| B1 |  | 1.690013184317961e-001 |
| C1 |  | 1.000000000000000e-000 |
| D1 |  | 9.318389807665928e-002 |
| Aobd | Observer coefficients | 1.000000000000000e-000 |
| Bobd |  | 8.847360000000000e-001 |
| L |  | 0.08 |
| S1 | Sliding mode control gains | 1 |
| S0 |  | 0.01 |
| $\gamma$ |  | −25% |
| $\eta$ |  | +25% |
| Koubai | Decrease of target value per step (4.0 msec) | −12 rpm/0.004 sec |

TABLE 2

| Initial value | Value (physical value) |
|---|---|
| X1 (0) | 0 |
| u1 (0) | 0 |
| $\Delta Nt'$ (0) | Koubai |
| Nt' (0) | 0 |
| r (0) | 0 |
| X_12 (0) | 0 |

As is apparent from the above description of the specific example, the control apparatus of the embodiment is able to properly control a control system having a large amount of dead time by providing an estimated quantity of state, with the dead time taken into consideration, and outputting an quantity of operation determined based on the estimated amount of control.

Although in the specific example of the first embodiment, the dead time in the observer is updated at every step, the dead time may also be updated at every few or several steps.

For example, update of the dead time at a rate of once in every four steps can be accomplished by substituting the expression between the parentheses in the last term on the right side of equation (21) with ΔNt'(k')−ΔNt(k'), where k' is determined as in equation (27). In equation (27), [k/4] is the integer part of the quotient of division of k by 4. For example, if k is 1, 2, 3, 4, 5, [k/4] is 0, 0, 0, 1, 1, respectively. Then, k' becomes 0, 0, 0, 4, 4, respectively, since k' is four times [k/4].

$$k'=4\times[k/4] \quad (27)$$

In this control, the feedback loop from the quantity of operation u indicated in FIG. 12 is performed with a shortest-possible sampling time due to the sliding mode control, so that the correction feedback loop from the actual quantity of state can be performed at a sampling period that meets a responsiveness requirement of the feedback control system.

Figure 15:
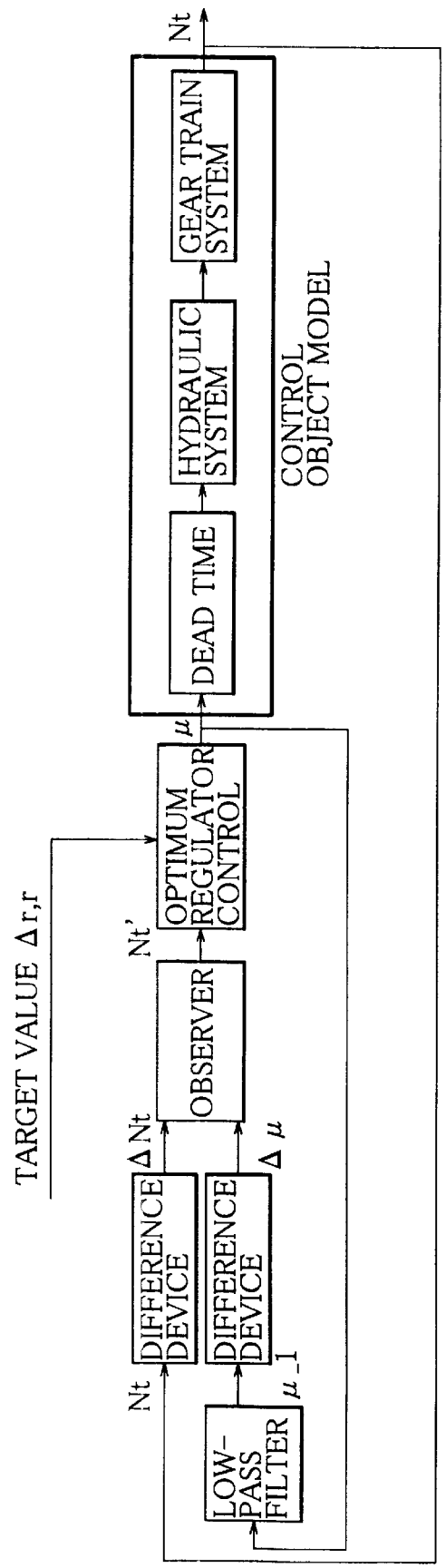
FIG. 15 is a block diagram of a specific example of a construction for control where an automatic transmission is controlled by an optimum regulator control.

Although the control apparatus of the second embodiment is described with reference to the specific example employing the sliding mode control method, a control apparatus that does not employ the sliding mode control method is also possible according to the second embodiment. For example, an optimum regulator control may be employed instead of the sliding mode control method. An apparatus employing the optimum regulator control is illustrated in the block diagram of FIG. 15. In this case, the feedback output, that is, the quantity of operation u, can be determined by using equation (28) instead of equation (24). In equation (28), Kc is a coefficient. Except equations (23) and (24), the optimum regulator control uses the same equations as those used in the sliding mode control method.

$$u=-Kc\times\Delta Nt'(k+1) \quad (28)$$

Figure 16A:
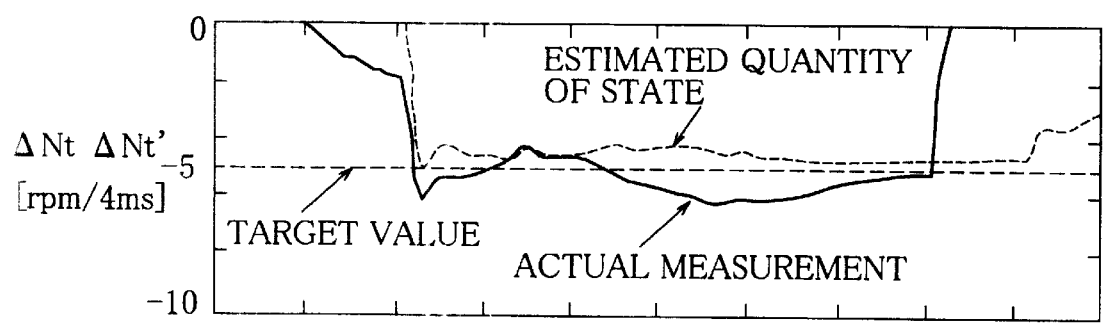
FIGS. 16A and 16B are graphs indicating results of a simulation of the specific example shown in FIG. 15, that is, time-dependent changes of the rotation speed changing rate and time-dependent changes of the rotation speed.
Figure 16B:
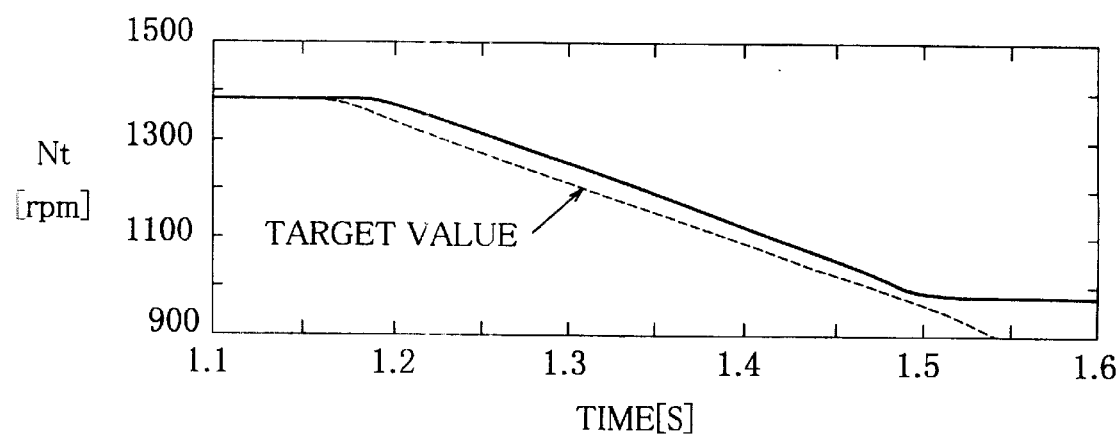
Figure 17:
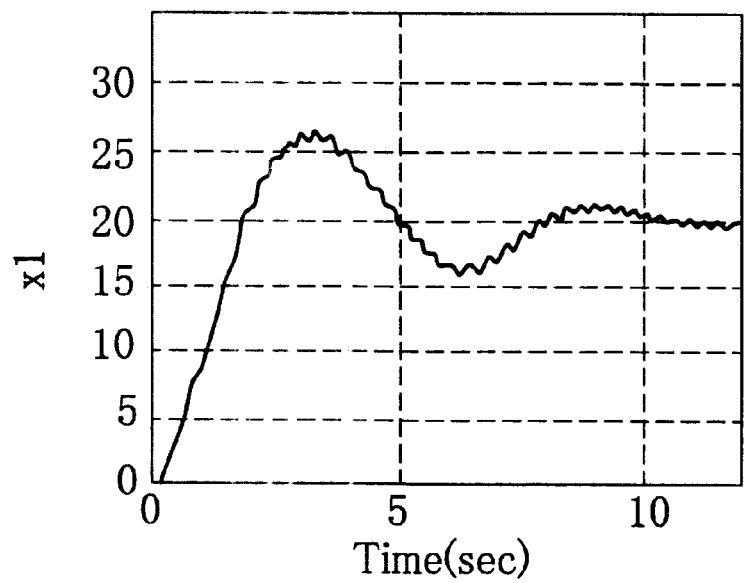
FIG. 17 is a graph indicating time-dependent changes of the slip speed x1 in a slip speed control system to which an ordinary sliding mode control method is applied.
Figure 18:
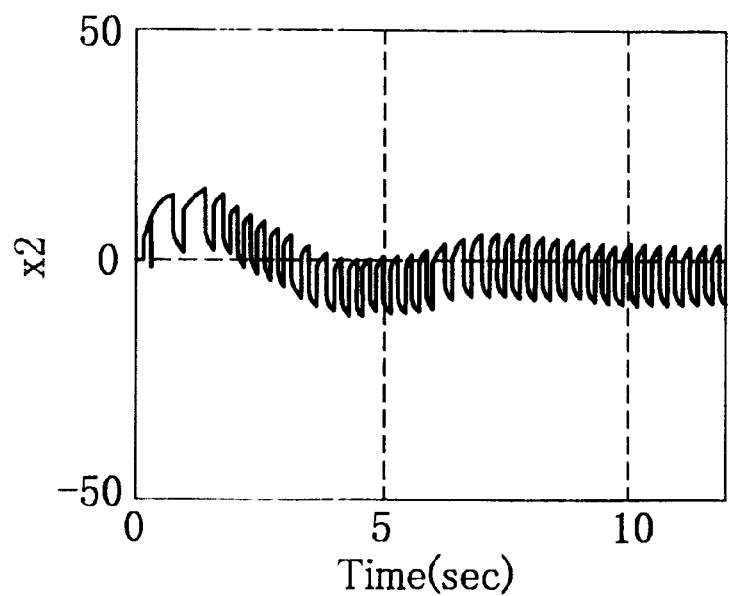
FIG. 18 is a graph indicating time-dependent changes of the time-differential x2 of the slip speed x1 in the slip speed control system to which the ordinary sliding mode control method is applied.
Figure 19:
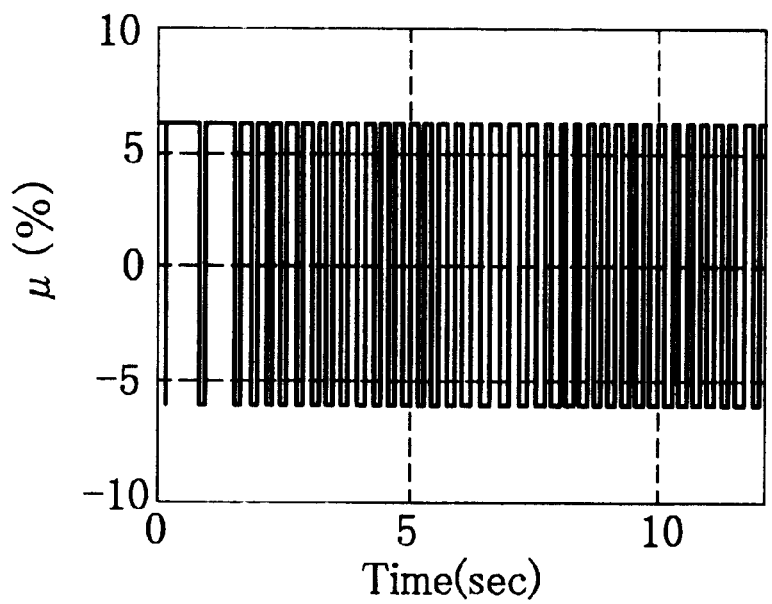
FIG. 19 is a graph indicating time-dependent changes of the control input value u in the slip speed control system to which the ordinary sliding mode control method is applied.
Figure 20:
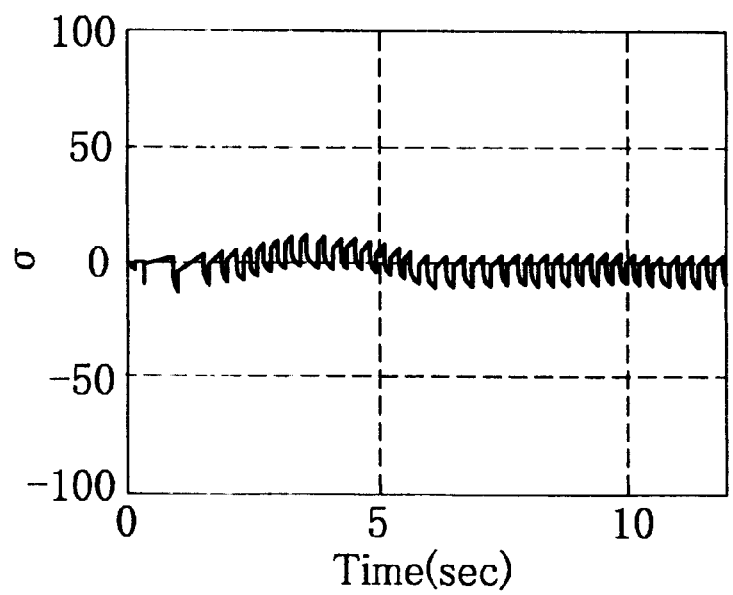
FIG. 20 is a graph indicating time-dependent changes of the switching surface σ in the slip speed control system to which the ordinary sliding mode control method is applied.

For a simulation of a specific example of the optimum regulator control, substantially the same coefficients and initial values shown in Tables 1 and 2 are used, except that the observer coefficient L is changed to 0.12. The simulation provides results as indicated in FIGS. 16A and 16B. As can be seen from the results of the simulation indicated in FIGS. 16A and 16B, the rotation speed changing rate ΔNt and the estimated value ΔNt' thereof change over time in the vicinity of the target value, and the rotation speed Nt changes in a manner similar to the manner of change of the target value while remaining slightly higher than the target value. Thus, proper control is accomplished in comparison with the related art shown in FIGS. 21 and 23.

Thus, besides achieving advantages in the application of the sliding mode control method, the control apparatus of the embodiment achieves substantially the same advantages in the application of other control methods, for example, the optimum regulator control or the like.

While the present invention has been described with reference to what are presently considered to be preferred embodiments thereof, it is to be understood that the present invention is not limited to the disclosed embodiments or constructions. On the contrary, the present invention is intended to cover various modifications and equivalent arrangements. In addition, while the various elements of the disclosed invention are shown in various combinations and configurations, which are exemplary, other combinations and configurations, including more, less or only a single embodiment, are also within the spirit and scope of the present invention.

What is claimed is:

1. A control apparatus for controlling a control system having a dead time, comprising:

an observer that estimates a present estimated quantity of a state of the control system based on an actual quantity of the state, a quantity of operation of the control system, and an estimated quantity of the state that is estimated at least a predetermined length of time before present estimation of the estimated quantity of the state, and a controller that controls the control system based on the estimated quantity of the state estimated by the observer.

2. A control apparatus according to claim 1, wherein the observer estimates the present estimated quantity of the state of the control system based on the quantity of operation and a quantity of feedback for correction of an error between the actual quantity of the state and the estimated quantity of the state that is estimated at least the predetermined length of time before the present estimation.

3. A control apparatus according to claim 2, wherein the quantity of feedback is a quantity related to a deviation between the actual quantity of the state and a related quantity of the state that is provided based on the estimated quantity of the state estimated at least the predetermined length of time before the present estimation, plus a dead time factor.

4. A control apparatus according to claim 3, wherein the dead time factor is updated at every predetermined length of time.

5. A control apparatus according to claim 1, wherein the estimated quantity of the state estimated at least the predetermined length of time before the present estimation includes a plurality of estimated quantities of the state that are sampled at a plurality of times.

6. A control apparatus according to claim 5, wherein the estimated quantity of the state estimated at least the predetermined length of time before the present estimation is sampled at a frequency that is less than a frequency of sampling the actual quantity of the state.

7. A control apparatus according to claim 1, wherein the control system is a system that includes a hydraulic system having a dead time and a gear train system including a transmission, and the quantity of the state is a rotation speed of the transmission.

8. A control apparatus according to claim 1, wherein a switching surface is calculated in a sliding mode control method based on the estimated quantity of the state and a target value outputted from the observer, and the control system is controlled in accordance with a value of the quantity of operation switched based on a value of the switching surface.

9. A control apparatus according to claim 1, wherein the control system is controlled by an optimum regulator control method.

10. A control apparatus according to claim 1, wherein the observer estimates the estimated quantity of the state while correcting a parameter of a model of the control system based on the dead time.

11. A control apparatus according to claim 1, wherein the predetermined length of time is set based on the dead time of the control system.

12. A control method for controlling a control system having a dead time, comprising steps of:

estimating a present estimated quantity of a state of the control system based on an actual quantity of the state, a quantity of operation of the control system, and an estimated quantity of the state that is estimated at least a predetermined length of time before present estimation of the estimated quantity of the state, and controlling the control system based on the estimated quantity of the state estimated in the estimating step.

13. A control method according to claim 12, wherein the estimated quantity of the state is estimated while a parameter of a model of the control system is corrected based on the dead time.

14. A control apparatus for controlling a control system having a dead time by using a control input value, comprising:

a computing unit that computes one of a deviation between a target value of a quantity of a state and an actual value of the quantity of the state that is caused to follow the target value, and a time-integral of the deviation;

a filter which is set based on a frequency characteristic of a gain of the control system and a frequency characteristic of a phase of the control system, and which filters the one of the deviation and the time-integral computed by the computing unit;

a switching surface calculator that calculates a switching surface based on the one of the deviation and the time-integral of the deviation filtered by the filter; and a switcher that switches the control input value based on a value of the switching surface.

15. A control apparatus according to claim 14, wherein the filter is set by comparing the frequency characteristic of the gain and the frequency characteristic of the phase of the control system with the frequency characteristic of the gain and the frequency characteristic of the phase occurring at a characteristic variation point in the control system.

16. A control apparatus according to claim 14, wherein the filter has a coefficient that is set so as to provide a compensation in such a direction as to offset a characteristic variation between a design model that does not perform a filing process and a characteristic variation model in a frequency range in which the characteristic variation is relatively large.

17. A control apparatus according to claim 16, wherein the coefficient of the filter is set in accordance with a magnitude of the characteristic variation in a Bode diagram of the filter.

18. A control apparatus according to claim 14, wherein the control system having the large dead time is a clutch hydraulic control system installed in a vehicle.

19. A control apparatus according to claim 18, wherein the actual quantity of the state is a value regarding a slip speed of a clutch.

20. A control method for controlling a control system having a dead time by using a control input value, comprising steps of:

computing one of a deviation between a target value of a quantity of a state and an actual value of the quantity of the state that is caused to follow the target value, and a time-integral of the deviation;

filtering the one of the deviation and the time-integral computed in the computing step, by using a filter that is set based on a frequency characteristic of a gain of the control system and a frequency characteristic of a phase of the control system;

calculating a switching surface based on the one of the deviation and the time-integral of the deviation filtered in the filtering step; and switching the control input value based on a value of the switching surface.

21. A control method according to claim 20, wherein the control system having the dead time is a clutch hydraulic control system installed in a vehicle.

* * * * *